Feb. 17, 1931. C. S. HALL 1,792,738
AIRCRAFT
Filed Feb. 7, 1928 4 Sheets-Sheet 3
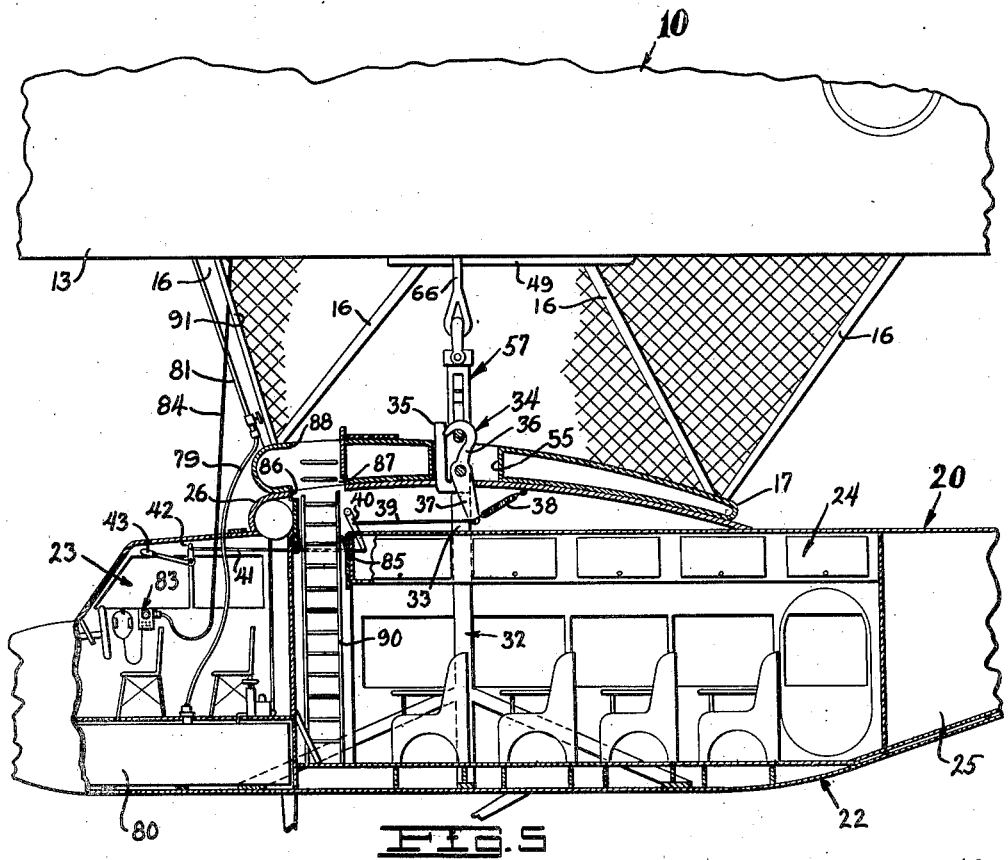
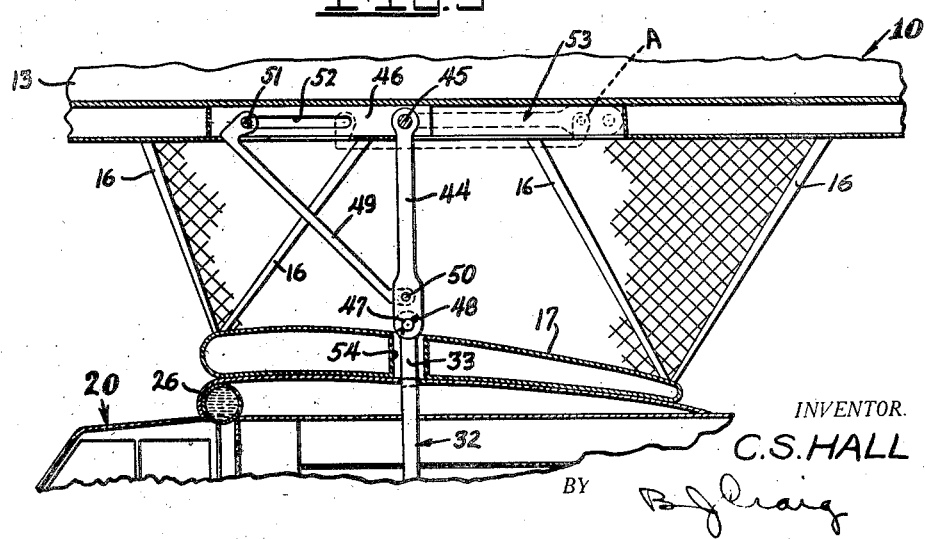
INVENTOR.
C. S. HALL
BY
ATTORNEY.

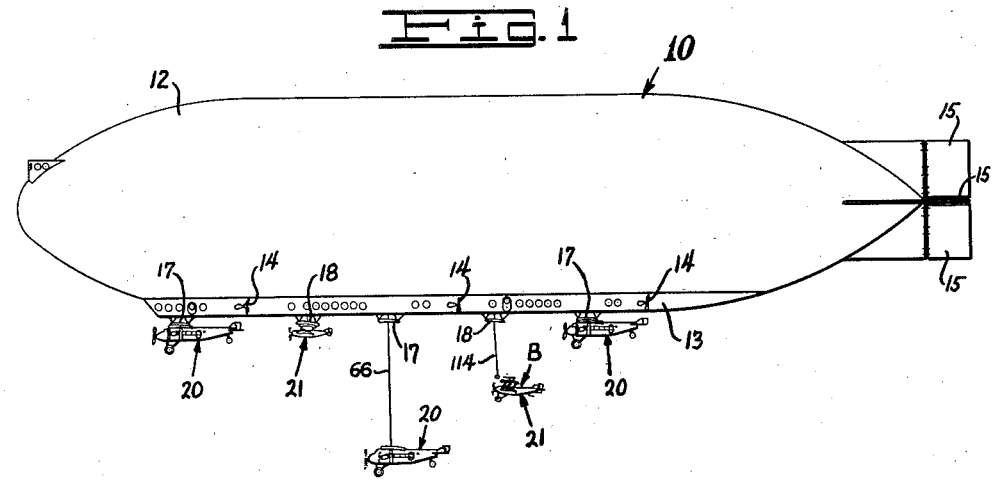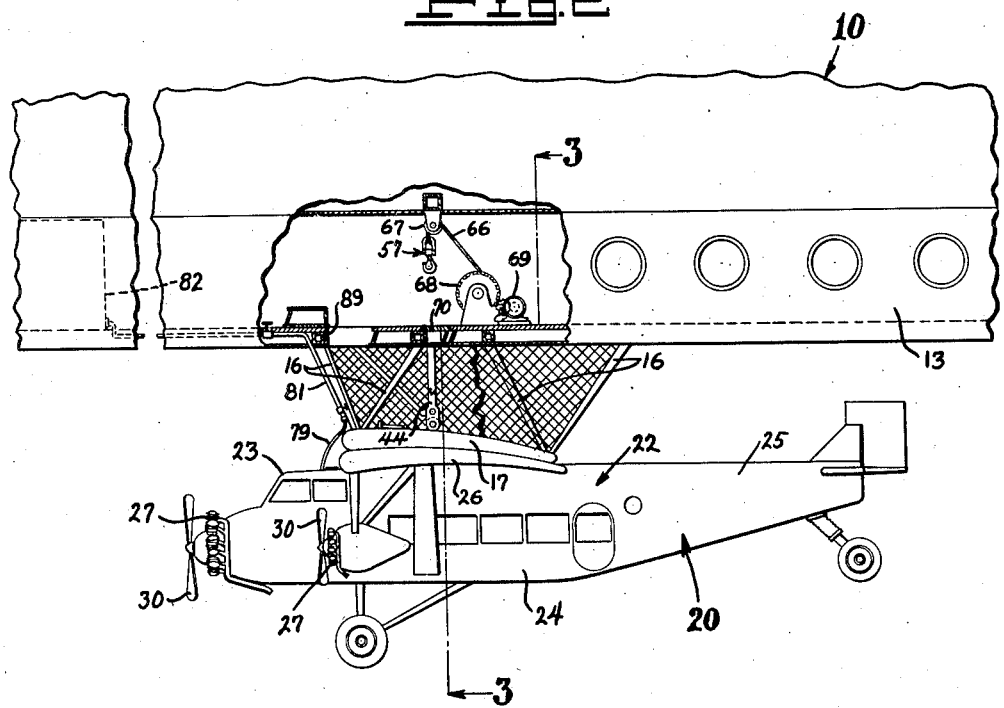

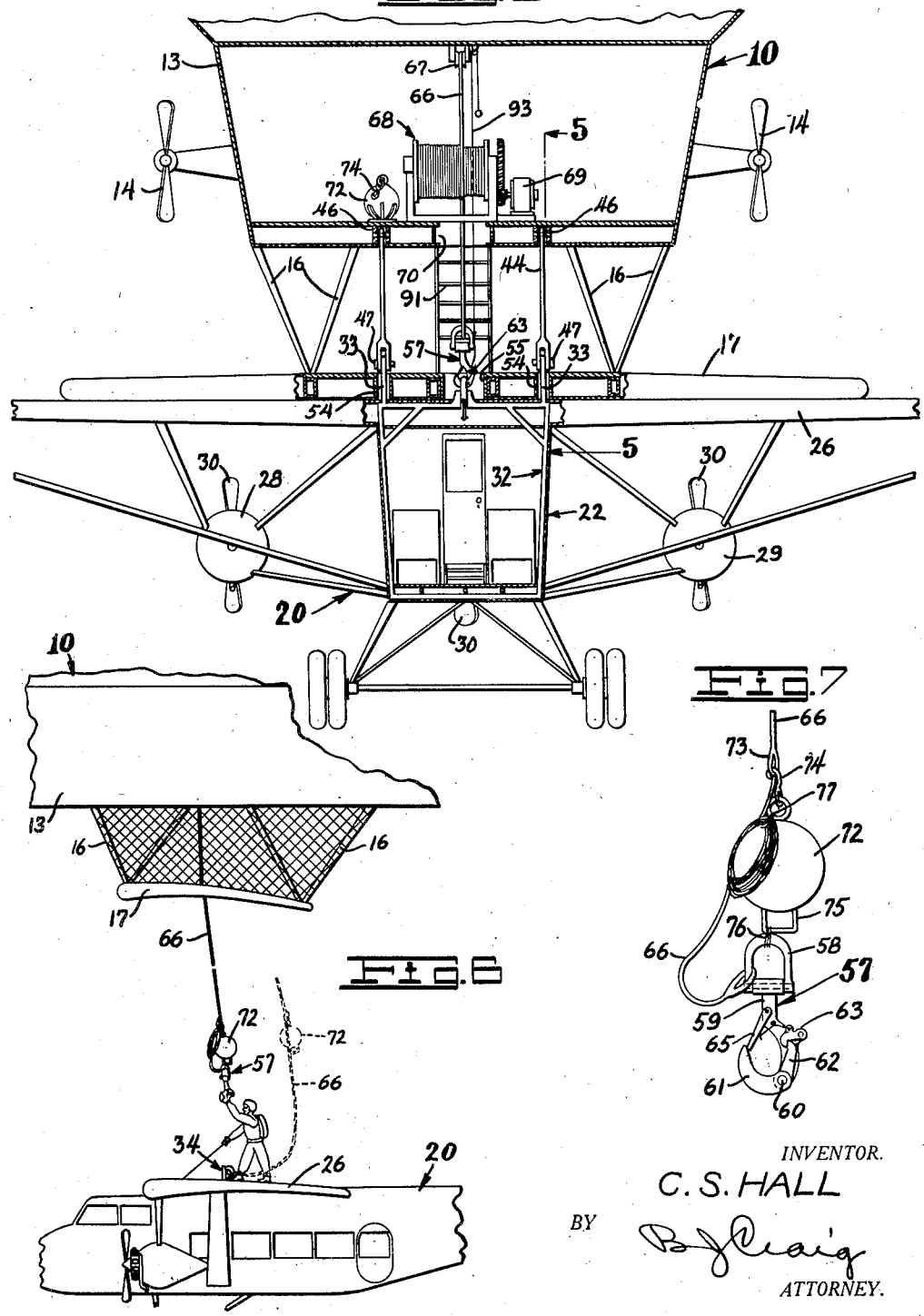

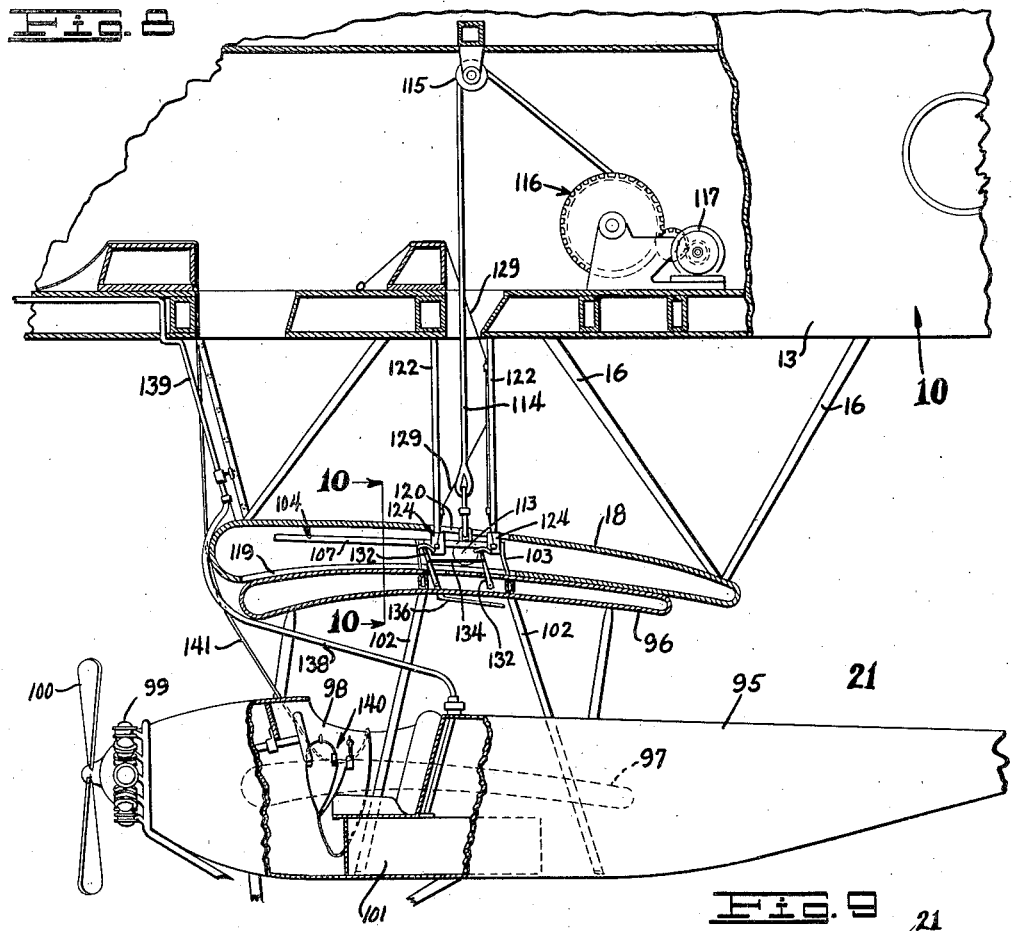

Patented Feb. 17, 1931

1,792,738

UNITED STATES PATENT OFFICE

CHARLES S. HALL, OF LOS ANGELES, CALIFORNIA, ASSIGNOR TO HALL ENGINEERING & AIRCRAFT CONSTRUCTION COMPANY, A CORPORATION OF NEVADA

AIRCRAFT

Application filed February 7, 1928. Serial No. 252,450.

This invention relates to improvements in aircraft.

The general object of this invention is to provide an improved lighter-than-air craft wherein all or a part of the propelling means is contained in a unit which is detachably secured to the lighter-than-air craft and which when detached is capable of sustained flight as a unit independent of the lighter-than-air craft.

Another object of this invention is to provide a lighter-than-air craft having heavier-than-air craft detachably secured thereto which are adapted to furnish some of the motive power for propelling the lighter-than-air craft, the main fuel supply for the heavier-than-air craft being carried by the lighter-than-air craft and connected to the fuel tanks of the heavier-than-air craft when the heavier craft are secured to the lighter.

A further object of the invention is to provide a novel means for securing a heavier-than-air craft to a lighter-than-air craft.

Another object of the invention is to provide an improved means whereby the heavier-than-air craft may be picked up by and secured to the lighter-than-air craft while both are in flight.

A further object of the invention is to provide means whereby the heavier-than-air craft may be released from the lighter-than-air craft by an operator on either craft.

Other objects of this invention will be apparent from the following description taken in connection with the accompanying drawings, wherein:

Fig. 1 is a side elevation of a lighter-than-air craft or dirigible embodying the features of my invention.

Fig. 2 is an enlarged fragmentary side view of the dirigible shown in Fig. 1 showing one of the heavier-than-air craft or airplanes attached thereto.

Fig. 3 is an enlarged section taken on line 3—3 of Fig. 2.

Fig. 4 is an enlarged fragmentary longitudinal section through the airplane shown in Fig. 2 and a portion of the dirigible.

Fig. 5 is an enlarged section taken on line 5—5 of Fig. 3 showing the means of securing the airplane to the dirigible.

Fig. 6 is a fragmentary side elevation of the dirigible and the airplane showing the manner in which the airplane is picked up by the dirigible.

Fig. 7 is an enlarged view of the weight and hook on the end of the pick up cables.

Fig. 8 is a view similar to Fig. 4 showing a modified means of attaching an airplane to the dirigible.

Fig. 9 is a fragmentary top plan view of the airplane shown in Fig. 8 on a reduced scale.

Fig. 10 is an enlarged section taken on line 10—10 of Fig. 8.

Fig. 11 is a section taken on line 11—11 of Fig. 10 and

Fig. 12 is an enlarged top plan view of a portion of the pick up rail used on the airplane shown in Figs. 8 and 9.

Referring to the drawings by reference characters I have indicated a dirigible embodying the features of my invention generally at 10. This dirigible may be of any desired type preferably of the rigid type and is shown as including a hull 12, a main cabin portion 13, driving propellers 14 and rudders 15.

Suspended a distance below the main cabin portion 13 of the dirigible by suitable braces 16 I show a plurality of transversely extending platforms 17 and 18. These platforms are preferably made streamline in shape of wings and act as sustaining surfaces when the dirigible is in flight.

Large airplane indicated generally at 20 of the passenger carrying type are shown as adapted to be secured to the dirigible adjacent the under side of the platforms 17 and smaller airplanes indicated generally at 21 are shown as adapted to be secured to the dirigible adjacent the under side of the platforms 18.

The passenger carrying airplanes 20 may be of any desired type but I have shown them of the tri-motored monoplane type and as including a fuselage indicated generally at 22, an operator's compartment 23, a passenger cabin 24, a storage compartment 25, and wings 26. The three motors 27, 28, and 29 of the airplane 20 are shown as mounted thereon in the usual manner, one at the nose and two suspended from the wings on either side of the fuselage 22 and include propellers 30.

The airplanes 20 are provided with a suspending frame 32 which includes rigid suspension arms 33 and a central bracket 34. As clearly shown in Fig. 4, this bracket 34 includes a stationary arm 35 and a pivoted hook 36 which engages the arm 35 adjacent the upper end. The opposite end of the pivoted hook is provided with an arm 37 to which one end a coiled spring 38 is secured. This coiled spring is adapted to normally urge the hook 36 into engagement with the arm 35.

For moving the hook 36 out of engagement with the arm 35 I provide a rod 39 which is secured at one end to the hook arm 37 and at the opposite end to a pivoted lever 40. Another rod 41 is connected at one end to the lever 40 and at the opposite end to a privoted lever 42 having an operating handle 43 thereon. The lever 42 and handle 43 are preferably located in the control cabin 23 of the airplane so that the hook 36 may be actuated by the operator of the airplane.

For securing the airplane 20 to the dirigible I provide arms 44 pivoted as at 45 to a plate 46 on the dirigible as shown in Fig. 5. These arms 44 are adapted to engage the arms 33 of the airplane frame 32 and be connected thereto by pins 47 which may be retained in position by cotter pins 48, or in any other suitable manner. Each of the arms 44 have a brace 49 pivoted thereto as at 50 and the opposite end of the brace 49 is provided with a pin 51 which is adapted to work in a slot 52 in the plate 46. When the airplanes 20 are not secured to the dirigible the arms 44 and the braces 49 are adapted to be folded up and housed within a recess 53 in the dirigible as shown by the dotted lines at A in Fig. 5, thus lessening the air friction on the dirigible. The arms 33 of the airplane frame 32 extend through apertures 54 in the platform 17 and the central bracket 34 of the airplane frame projects through an aperture 55 in the platform 17.

For picking up the airplanes 20 I provide a hook device indicated generally at 57 and shown in detail in Fig. 7. The device 57 is shown as including a clevis 58 having a shank 59 pivotally connected thereto to which is pivotally connected at 60 a hook portion 61. This hook portion 61 includes an arm 62 which is adapted to be retained in position by a latch member 63 pivoted to the shank 59. A safety latch 65 is also preferably provided.

One end of a cable 66 is connected to the clevis 58 of the device 57 and the opposite end of the cable is shown as adapted to pass over a pulley 67 in the dirigible and be wound upon a hoisting drum 68. The hoisting drum 68 is shown as adapted to be actuated by an electric motor indicated at 69. A hatchway 70 is provided in the bottom of the dirigible to allow the cable 66 to pass through.

When the cable 66 is lowered from the dirigible to pick up an airplane a weighted member 72 is connected to an eye 73 in the cable by a releasable catch 74. The clevis 58 of the hook device 57 is connected as by light string to a handle 75 on the weighted member as indicated at 76 and the cable 66 between the clevis 58 and the eye 73 is coiled and connected to the weighted member by light string as indicated at 77 (see Fig. 7).

When an airplane is to be picked up by the dirigible the cable 66 is lowered and the airplane flies below the dirigible at substantially the same speed at which the dirigible is traveling. One of the operators of the airplane ascends to the top of the airplane as shown in Fig. 6 and grasps the hook device 57 and with a slight tug breaks the strings 76 and 77 holding the device 57 and the coiled portion of the cable 66. The released coiled portion of the cable 66 provides enough slack for the operator to fasten the device 57 to the bracket 34 of the airplane before the swinging of the cable is likely to jerk the device 57 out of his grasp. After the device 57 is connected to the airplane bracket 34 the cable 66 is drawn taut by the hoisting drum 68 and the airplane is raised to position beneath the platform 17.

During the raising of the airplane into position beneath the platform the airplane maintains a flying speed relative to the speed at which the dirigible is traveling. When the airplane is in position beneath the platform 17 it is connected to the arms 44 of the dirigible as previously described.

When the airplane is connected to the dirigible the hook device 57 is preferably detached from the airplane and raised up into the dirigible as shown in Fig. 2.

The airplane when secured to the dirigible is preferably used to assist in driving the dirigible.

As shown in the accompanying drawings and particularly in Figs. 2 and 4, I preferably connect a flexible hose 79 to the fuel tank 80 of the airplane. The flexible hose 79 is connected to a pipe 81 which is connected to a fuel supply tank 82 on the dirigible (see Fig. 2). I also preferably provide a telephone transmitting and receiving set indicated at 83 in the operator's compartment of the airplane, which is connected by means of an electrical cable 84 to the dirigible to provide a means of communication between the airplane and the dirigible.

To allow the operators or passengers of the airplane to pass to and from the dirigible and airplane I have shown hatchways 85 and 86 in the airplane, hatchways 87 and 88 in the platform 17 and a hatchway 89 in the bottom of the dirigible. A ladder 90 is preferably provided in the airplane 20 and a ladder 91 is preferably provided on the dirigible leading from the platform 17 to the hatchway 89.

When it is desired to launch the airplane 20 from the dirigible the electric cable 84 and the fuel supply hose 79 are removed from the airplane, the hook device 57 connected to the airplane bracket 34 and the dirigible arms 40 disconnected from the airplane arms 33, thus leaving the airplane suspended on the cable 66. The airplane may now be released from the dirigible by one of the airplane operators moving the hand lever 43 which, through the medium of the lever 42, rod 41, lever 40 and rod 39, will rock the hook 36 of the bracket 34 out of engagement with the hook 61 of the device 57 and thus free the airplane from the dirigible.

The airplane may also be released by an operator on the dirigible. To provide for this, a cord 93 is connected to the latch 63 of the device 57 as shown in Fig. 3. When an operator on the dirigible pulls the cord 93 the cord moves the latch 63 out of engagement with the arm 62 of the hook 61 and the weight of the airplane rocks the hook 61 on its pivot 60, whereupon the airplane bracket 34 becomes disengaged from the device 57 and thus frees the airplane from the dirigible.

In Figs. 8 to 11 inclusive I have shown a modified means of picking up and securing an airplane to the dirigible 10. This modification is shown in connection with one of the smaller airplanes 21. As shown, this airplane 21 includes a fuselage indicated generally at 95, having superimposed wings 96 and 97 mounted thereon, an operator's compartment 98, a motor 99, which includes a driving propeller 100, and a fuel tank 101.

The airplane 21 is provided with suspending frames 102 having legs 103 thereon which extend through the upper wing 96 and on which a frame indicated generally at 104 is mounted. This frame 104 includes a central circular portion 105 having an entrance neck 106 from which oppositely disposed guide members 107 diverge outwardly towards the ends of the wings as shown in Fig. 9. The rear of the circular portion 105 is formed into a yoke 108 and electro-magnets 109 are positioned adjacent the rear of the circular portion 105 as shown in Fig. 12. The electromagnets 109 are shown as connected by wires 110 to a generator 112.

When it is desired to pick up the airplane 21 a spherical member 113 connected to one end of a cable 114 is lowered from the dirigible. The opposite end of the cable 114 is shown as adapted to pass over a pulley 115 and be wound upon a hoisting drum 116 which is shown as actuated by a rotor 117.

When the spherical member 113 is lowered the airplane 21 flies toward it, as indicated at B in Fig. 1, and as the airplane passes beneath the spherical member the guides 107 of the frame 104 engage the cable 114 and direct the spherical member towards the circular portion 105. As the spherical member nears the circular portion 105 the electro-magnets 109 attract the spherical member (which is made of iron for that purpose) and draw it towards them. The cable 114 is then pulled towards the dirigible by the hoisting drum 116 and as the spherical member 113 is larger than the opening in the circular portion 105 the spherical member engages the circular portion and hoists the airplane up to the dirigible platform 18.

The under surface of the platform 18 is provided with an aperture 119 through which the airplane frame 104 passes and is positioned within the platform as shown in Fig. 8. An aperture 120 is provided in the top surface of the platform 18 through which the cable 114 operates.

For securing the airplane to the dirigible I provide on the dirigible a pair of downwardly extending arms 122 each of which is forked at its lower end as at 123 and provided with pivoted hooks 124. The pivoted hooks 124 each include an extension arm 125 which is adapted to be engaged by a latch 126 pivoted to the forks 123 and provided with extended release arms 127.

When the airplane 21 is hoisted up to the platform 18 the hooks 124 of the arms are positioned to engage the underside of the frame 104 adjacent the circular portion 105 as shown in Fig. 10, and indicated by the dotted lines in Fig. 12. After the airplane 21 is connected to the dirigible arms 122 the spherical member 113 is removed from the cable 114 and the cable drawn up into the dirigible.

For releasing the airplane 21 from the dirigible by an operator on the dirigible cords 129 are provided which are connected to the latches 126 by branch cords 130 as clearly shown in Fig. 10. When the cords 129 are pulled upward they move the latches 127 out of engagement with the hook arms 125, whereupon the weight of the airplane causes the hooks to swing on their pivots out of engagement with the airplane frame 104, thereby freeing the airplane from the dirigible.

For releasing the airplane from the dirigible from the operator's compartment of the airplane I provide two pairs of levers 132, each of which include a cam member 134 which is adapted to engage the end of the adjacent latch release arm 127. Each pair of the levers 132 is secured to a shaft 133 which is mounted in a bearing 133'. The pairs of levers 132 are connected together by rods 135 and on one of the shafts 133 a hand lever 136 is secured. When the hand lever 136 is moved downward it rocks the shaft 133 to which it is secured, which in turn rocks the levers 132 thereon, which, through the medium of the rods 135 rocks the other pair of levers 132.

As the levers 132 are rocked the cams 134 thereon engage the latch release arms 127 and move the latches 126 out of engagement with the hook arms 125, whereupon the weight of the airplane swings the hooks 124 on their pivots out of engagement with the airplane frame 104, thus freeing the airplane from the dirigible.

When the airplane 21 is connected to the dirigible it may be used to assist in propelling the dirigible. For supplying fuel to the airplane 21 while it is connected to the dirigible I provide a hose 138 connected at one end to a pipe 139, which leads from the fuel tank 82 on the dirigible and the opposite end of the hose 138 is connected to the inlet pipe of the airplane fuel tank 101. For affording communication between the dirigible and airplane I provide a telephone transmitting and receiving set indicated generally at 140 on the airplane 21 and connected to the dirigible by an electric cable 141.

The airplanes 20 and 21 are shown as adapted to be manually controlled but with very slight changes in the pick up devices they can be controlled by wireless from the dirigible 10. The pick up mechanism of the airplane 21 as described is particularly adapted for use in connection with a wireless controlled airplane.

From the foregoing description it will be apparent that I have provided improved means for picking up airplanes from a dirigible and for securing the airplanes to the dirigible whereby the airplanes assist in propelling the dirigible.

Having thus described my invention, I claim:

1. In combination with a dirigible, an airplane, means on said dirigible coacting with means on said airplane to pick up said airplane while both said airplane and said dirigible are in flight, said pick up means including coacting magnetic members.

2. In combination with a dirigible, an airplane, means to secure said airplane to said dirigible, means on said dirigible to release said airplane from said dirigible while in flight and means on said airplane to release said airplane from said dirigible while in flight.

3. In combination with a dirigible, an airplane, means on said dirigible coacting with means on said airplane to pick up said airplane while both said airplane and said dirigible are in flight, and means on said airplane adapted to attract said pick up means on said dirigible towards said pick up means on said airplane.

4. In combination with a dirigible, an airplane, means to secure said airplane to said dirigible whereby said airplane assists to drive said dirigible, means on said dirigible to release said airplane from said dirigible while in flight and other means on said airplane to release said airplane from said dirigible while in flight.

5. In combination with a dirigible, an airplane, a transverse platform adjacent the underside of said dirigible, means on said dirigible coacting with means on said airplane adapted to secure said airplane adjacent the underside of said platform, said means including a plurality of arms pivotally connected to said dirigible, braces for said arms, said arms and said braces being movable into and out of operative position, said arms when in an inoperative position being movable to collapsed position against the bottom of said dirigible.

6. In combination with a dirigible, a platform adjacent the underside of said dirigible and spaced therefrom, said platform being streamline in shape to form a wing, an airplane, means to secure said airplane to said dirigible, said airplane including a wing, the under surface of said dirigible platform being shaped to conform to the upper surface of said airplane wing whereby said airplane wing may be nested against the under surface of said dirigible platform.

In testimony whereof, I hereunto affix my signature.

CHARLES S. HALL.